United States Patent
Burcham et al.

(10) Patent No.: US 7,472,376 B2
(45) Date of Patent: Dec. 30, 2008

(54) METHOD AND SYSTEM FOR CUSTOMIZATIONS IN A DYNAMIC ENVIRONMENT

(75) Inventors: Aaron T. Burcham, Bellevue, WA (US); Paul S. Harrington, Seattle, WA (US); C. Douglas Hodges, Sammamish, WA (US); Rahul S. Kumar, Kirkland, WA (US); James Kal Yu Lau, Redmond, WA (US); Timothy Rand Sullivan, Seattle, WA (US); Jason J. Weber, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 700 days.

(21) Appl. No.: 11/139,816

(22) Filed: May 27, 2005

(65) Prior Publication Data

US 2006/0271910 A1    Nov. 30, 2006

(51) Int. Cl.
*G06F 9/44* (2006.01)
(52) U.S. Cl. .................. 717/113; 717/106; 717/121; 715/765
(58) Field of Classification Search ............ 717/106, 717/105, 113; 715/765
See application file for complete search history.

(56) References Cited

U.S. PATENT DOCUMENTS 5,689,708 A * 11/1997 Regnier et al. .............. 709/229
5,900,871 A * 5/1999 Atkin et al. ................. 715/866
6,512,526 B1 * 1/2003 McGlothlin et al. ......... 715/762
6,636,691 B2 * 10/2003 Winter ........................ 386/95
7,320,068 B2 * 1/2008 Zimniewicz et al. .......... 713/1
2003/0140120 A1 * 7/2003 Hartman ..................... 709/219
2007/0180066 A1 * 8/2007 Sherwood et al. ........... 709/220

FOREIGN PATENT DOCUMENTS

WO     WO0167286 A2 *  9/2001

OTHER PUBLICATIONS

North et al., "Snap-Together Visualization: A User Inferface for Coordinating Visualizations via Relational Schemata", Univ. of Md., Dept. of Comp. Sci.; ACM 1-58113-252-2/00/0005; 2000.*
Gajos, et al., "Supple: Automatically Generating User Interfaces", IUI '04, ACM 1-58113-815-6/04/0001; 2004.*

* cited by examiner

*Primary Examiner*—Wei Y Zhen
*Assistant Examiner*—Ryan D Coyer
(74) *Attorney, Agent, or Firm*—Woodcock Washburn LLP

(57) ABSTRACT

Systems and methods for applying both profile and user customizations to an application user interface are provided. Profile customizations, created for a specialized use or field, are adapted to an application user interface, which has command-menu-toolbar contributions from various add-in modules. The user has access to the customizations through a user interface. Then, as a user is customizing the application, through commands, toolbars, and menus, the user customizations are tagged. A priority and group is assigned to each customization to allow for relative positioning of each customization. The difference between the user's final desired state and a reset state is computed. This difference computation is used to track the changes made to the application and to assist in resets of the customizations.

20 Claims, 9 Drawing Sheets

METHOD AND SYSTEM FOR CUSTOMIZATIONS IN A DYNAMIC ENVIRONMENT

FIELD OF THE INVENTION

The present invention is directed to application user interfaces. More particularly, the invention is directed to customizations of application user interfaces.

BACKGROUND

The usability of an application can be essential to its success. In addition, increased support for customization and localization of applications means that an application can be tailored to reach a larger audience. The wide use of features such as common dialog boxes and controls has increased consistency between applications. Application developers may take the same software package and simply customize and/or localize the interface for a particular audience. For example, engineers may desire a particular user interface for a word processing application; whereas legal professionals may find a somewhat different user interface more productive.

Hence application developers need to be able to customize an application user interface (UI) for different types of users and industries. These types of customizations are referred to as profile customizations. In profile customization, application developers change the visibility and presentation of commands, menus, toolbars, or other features of an application UI for a particular and specified use. In addition to specialized profile customizations, users like to customize so that they can tailor an application even more specifically to apply enterprise wide uniformity or even at the granularity of a single individual. For example, a corporation may have a customized toolbar that is essential to their business and simplifies the operation of an application. Or a particular user may customize an application UI to meet their personal preferences.

In some cases, profile customizations and user customizations may both be desirable. For example, an engineering company may employ an engineering-specific application, and an individual at this company may wish to further customize a particular menu or toolbar of the application UI.

Various applications, such as spreadsheets, word processors, and games, allow the incorporation of customizations to the application UI from both users and profiles. The customizations are typically applied to commands, toolbars, menus, and keyboard shortcuts of the particular application but may also be applied to, for example, window layouts. Examples of the customizations include hiding a command bar, creating a new command bar, deleting a menu, adding a new command to a command bar, and removing a command from a group within a menu or toolbar.

Depending upon the application, users may wish to customize the application UI to better fit their own personal use of the application. For example, a particular user may find that a certain command within a menu is never used and, therefore, wishes to remove the command. Or a user may desire a command bar that only contains that particular user's most frequently used commands. Similarly, different software modules contribute different customizations, in the form of profile customizations, based upon the application's use. For example, a toolbar may not be applicable to a particular application for one type of industry, so it is desirable to eliminate the toolbar through the use of profile customization by an application developer.

Furthermore, with the current growth of application and software functionality, there are many software programs, known as add-ins, that extend the functionality of larger, more complicated programs and applications. As the use of add-ins increases, the need to customize their features will also grow. With this increase, it will be important to a user for the add-ins' functionality to remain when customizing a particular application.

SUMMARY OF THE INVENTION

In consideration of the above-identified usability requirements with application user interfaces, the present invention provides a system and method for applying and merging user and profile customizations to an application user interface in an unknown environment.

The provided system and method incorporate an algorithm that tracks the changes a user makes to an application. After a command-toolbar-menu (CTM) module has been loaded to an application, profile customizations are adapted to the CTM, resulting in a customized application. A user of the current system makes customizations on top of this adapted application. The difference between a user's final desired state and a reset level is computed in order to track the changes to the CTM base level and to avoid an absolute record. An absolute record causes a reset to go back to the original base level, while a difference computation is more flexible.

Other advantages and features of the invention are described below.

BRIEF DESCRIPTION OF THE DRAWINGS

The systems and methods for customizing applications with both user and profile customizations in accordance with the present invention are further described with reference to the accompanying drawings in which.

DETAILED DESCRIPTION OF THE INVENTION

An application user interface (UI) is the junction that allows for interaction between a user and the actual computer application. The application UI is presented on the screen of a computer in a window, which is the area displaying the particular application. The commands, or computing task instructions, of the application are usually displayed in the UI as icons, buttons, or as the contents of a menu, toolbar, or command bar. Today, most application UIs are graphical (GUI) and are menu-based.

A menu includes a listing of different application commands in various formats, such as, for example and not limitation, pull-down menus where, once selected, the commands are shown as a vertical listing. Some applications contain multiple menus, each one related to a different task or function. A given menu may be divided into several groups, each group being a narrower subset of the menu in which it is contained. Menus may also be expandable. In an expandable menu, once a command is selected by a user, the user is presented with a second menu containing additional, related commands. A command in an expandable menu may lead, once selected, to further expandable menus. The commands in a menu may be identified in a variety of manners, such as a worded description, a well-known symbol, or both.

A toolbar is another means for displaying commands in an application UI. A toolbar is a horizontal or vertical bar, typically displayed on the edges of an application UI, containing various buttons that represent the commands. The toolbar commands are usually icons or symbols and may grouped together by function or feature. For example, editing commands may be symbolized by various icons and grouped together to form an editing toolbar. This editing toolbar may be horizontally positioned at the top of an application UI, for example.

As described in detail above, the ability to customize the application UI, and more particularly, but not limited to, the menus, commands, and toolbars of the application UI, is highly desirable. The customization desirability extends to individual users, groups such as corporations, and also to profiles.

The current method of handling both user and profile customizations incorporates one file for both the user and profile customizations, with the user customizations taking priority and being stored on top of the profile customizations. If a user wishes to reset customizations that the user has made in order to revert to a previous state, the reset does not simply undo the user customizations but instead goes back to the original application, which is the UI before the incorporation of either profile or user customizations. This results in both user and profile customizations being reset instead of just the user's customizations. This is clearly highly undesirable as the profile customization may be detailed and may provide needed customization for the user of the application.

Figure 1:
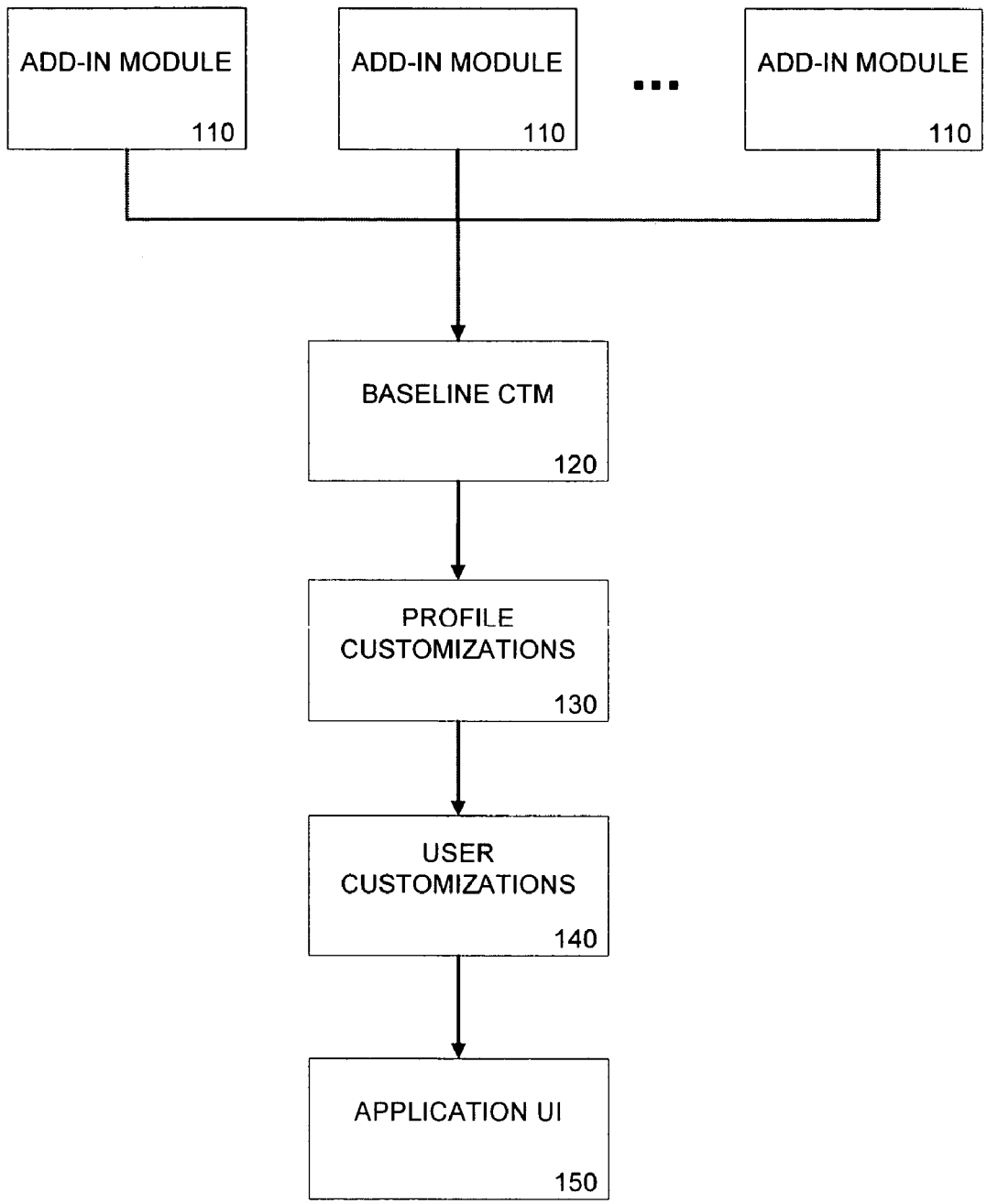
FIG. 1 is a block diagram illustrating a prior art implementation of an application customization.

FIG. 1 illustrates a current customization system 100. The various software modules contributing to the application UI are denoted as add-in modules 110. The present invention is not limited to a certain number of add-in modules 110 but may instead include any number of modules. Each add-in module 110 may have different CTM (command-toolbar-menu) contributions, and the contributions of each are merged and stored together to form the baseline CTM 120. Profile customizations 130 are applied on top of the baseline CTM 120, and user customizations 140 are then applied on top of the profile customizations 130. The customizations are then applied to the application UI 150, which is the customized application as seen by a user of the system 100.

As mentioned above, the current system does not provide for separation of the profile and user customizations, 130 and 140, respectively, after the customizations have been made. As an example of the disadvantages of this system, suppose that an application 150 has been updated with a profile customization 130 and/or a user customization 140. When an add-in software module 110 is added, then the merged baseline CTM 120 is regenerated from the current set of software modules 110, but the profile and user customizations, 130 and 140, respectively, are not properly re-applied. One skilled in the art can see that a choice between two unfavorable outcomes exists. Either the user of the system 100 is presented with the newly merged baseline CTM 120 that does not include their previous customizations, or the user is presented with the previous application UI that includes their customizations but does not include the UI contributions from the newly added software modules 110.

As another example of the disadvantages of the system 100, as shown in FIG. 1, suppose that an application 150 has been updated with a profile customization 130. Then suppose further that a user adds several new commands to a menu. After using the application, the user decides that the commands are not necessary and wishes to remove them. The user can reset the user customizations 140 but the profile customizations 130 are also lost and the user is faced with the application with the original CTM functionality only. Clearly, this is not an ideal situation for the user as it presents an application interface that the user is not expecting to see, or even desiring to use, after the reset has been performed.

Figure 2:
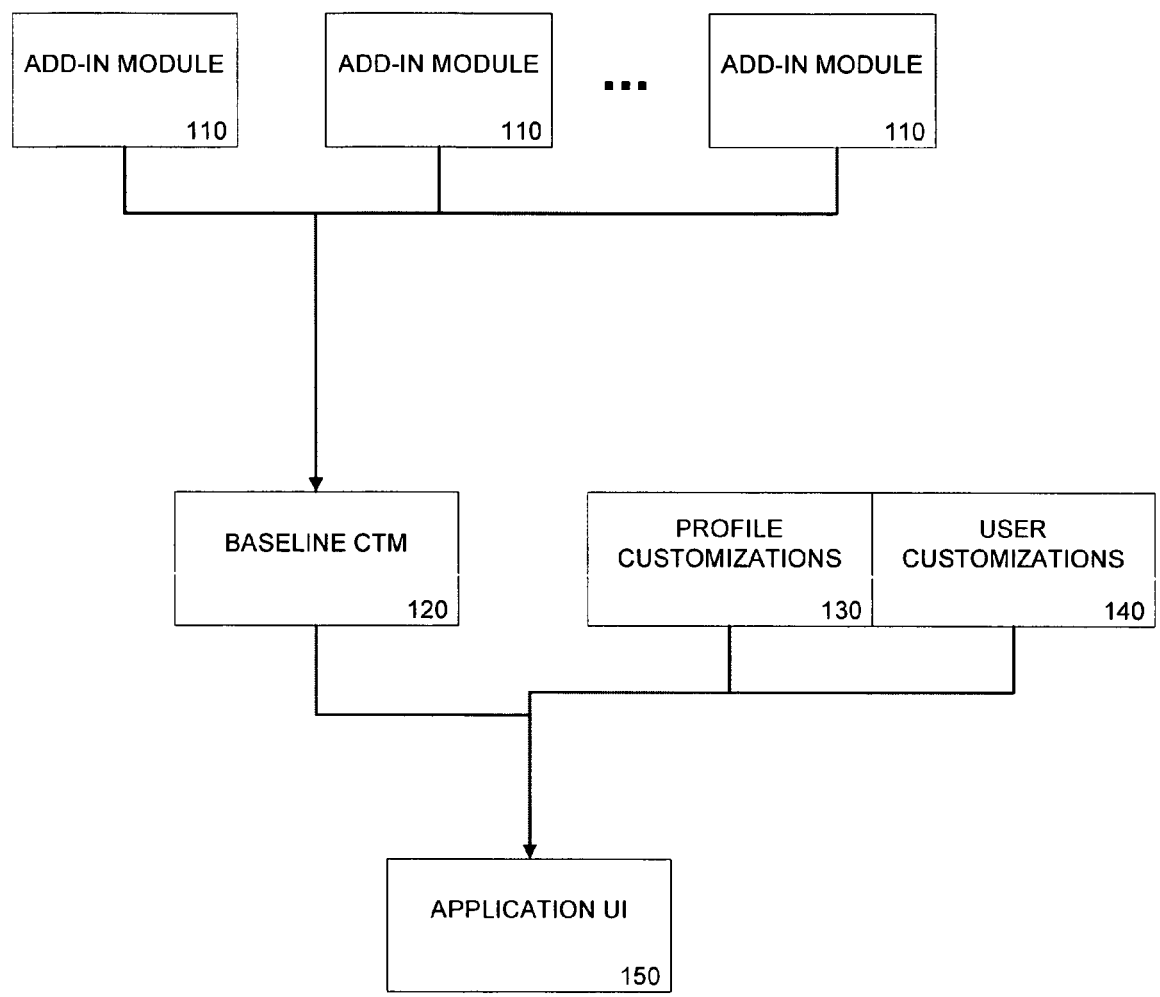
FIG. 2 is a block diagram illustrating an implementation of an application customization according to the present invention.

The block diagram of FIG. 2 represents an application UI customization system 200 that supports the merger of add-in module 110 CTM contributions with both profile customizations 130 and user customizations 140, in contrast to the implementation of FIG. 1 where user customizations overrule those of the profile and those contributed by the add-in modules 110.

Profile customizations 130 are the menu and toolbar customizations available for particular profiles, as discussed in more detail above. For example, a profile customization 130 may include a specialized version of an application for a particular industry built by an application developer. The individual profile customizations 130, once received, are sorted, or enumerated as a list, according to a group identity and priority, as described in more detail below. User customizations 140 may result from a user deleting a seldom-used command, reordering a menu, or making some other preferred change to the application UI 150. The user customizations 140, made by a user when accessing the application, are sorted concurrently by group identity and priority and then generated. The profile customizations 130 and the user customizations 140 are applied to the baseline CTM 120, which is the merger of CTM contributions from various add-in modules 110, to create a customized application UI 150.

In order to allow for a merger of the customizations, each command needs to be tagged with location information. The location information describes where in the menu or toolbar the customization has occurred. The priority sorting mentioned above for both the profile and user customizations is employed when applying the customizations in order to provide the necessary location information for the customizations of an application UI 150.

Figure 3:
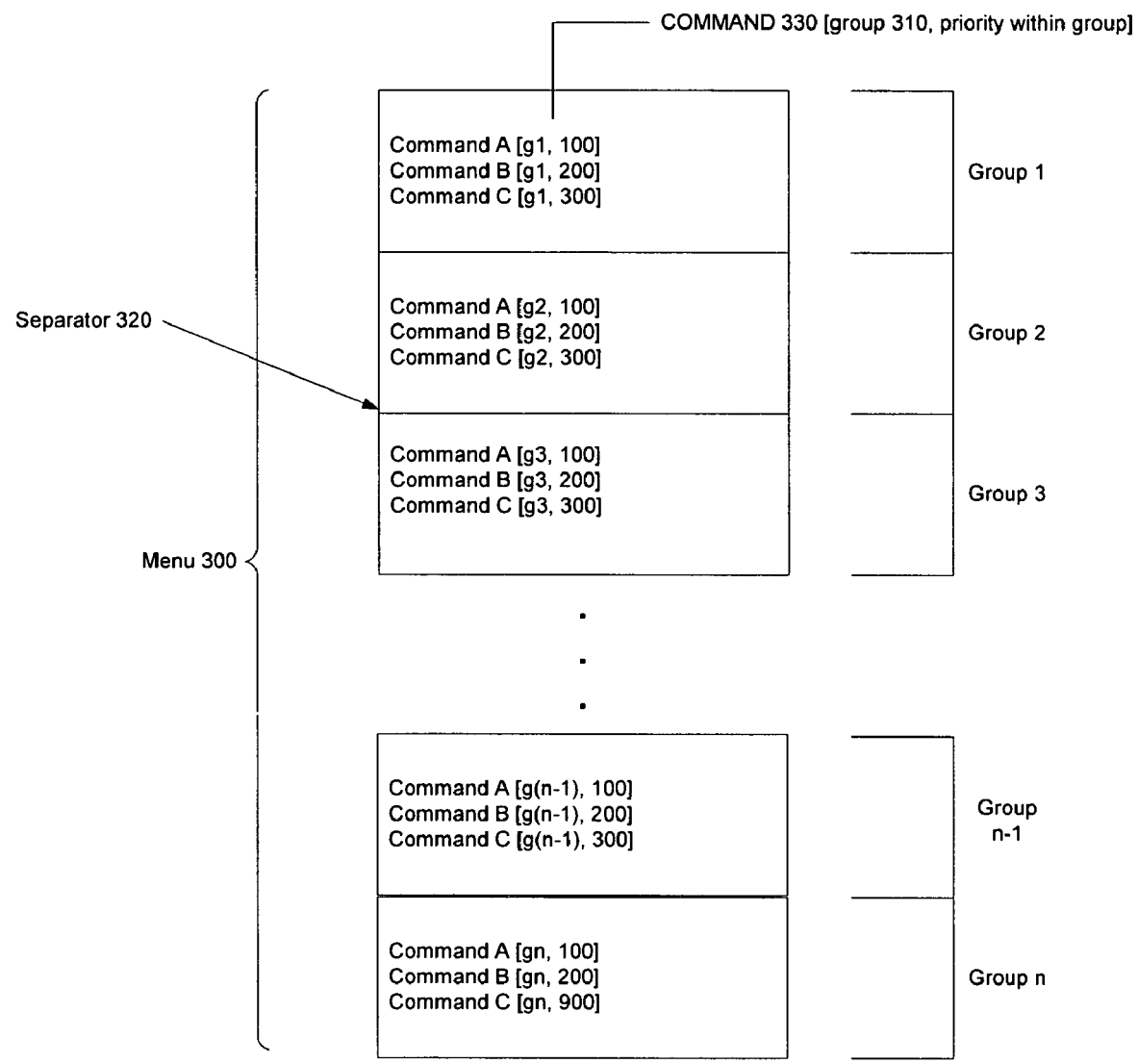
FIG. 3 is a diagram of a drop-down menu representation in accordance with the present invention.

The importance of the priority sorting is illustrated in FIG. 3, which diagrams a sample drop-down menu 300 of an application UI 150 in accordance with an aspect of the present invention. The menu 300 consists of different groups 310, group 1 through group n, separated by separators 320. Within each group, are commands 330.

Assigning a priority to each command 330 allows for a customization scheme that uses relative positioning. For example, if Command A is added and assigned a priority, it does not matter if Command B is deleted or moved as Command A will always be assigned the same position in the menu 300, the position being based on the specified priority.

Since different groups 310 exist in the menu 300, each customization needs to include a group identifier along with a priority. FIG. 3 shows the group identification and priority placement required for each command 330. For example, Command C [g3, 300] is a command existing in Group 3 with a priority of 300.

Figure 4A:
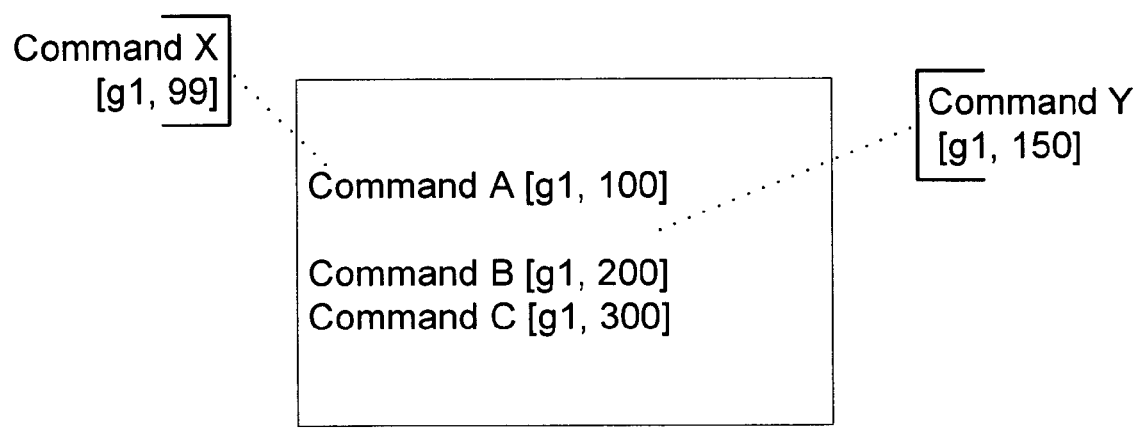
FIGS. 4a-4c illustrate customization examples according to the present invention.
Figure 4B:
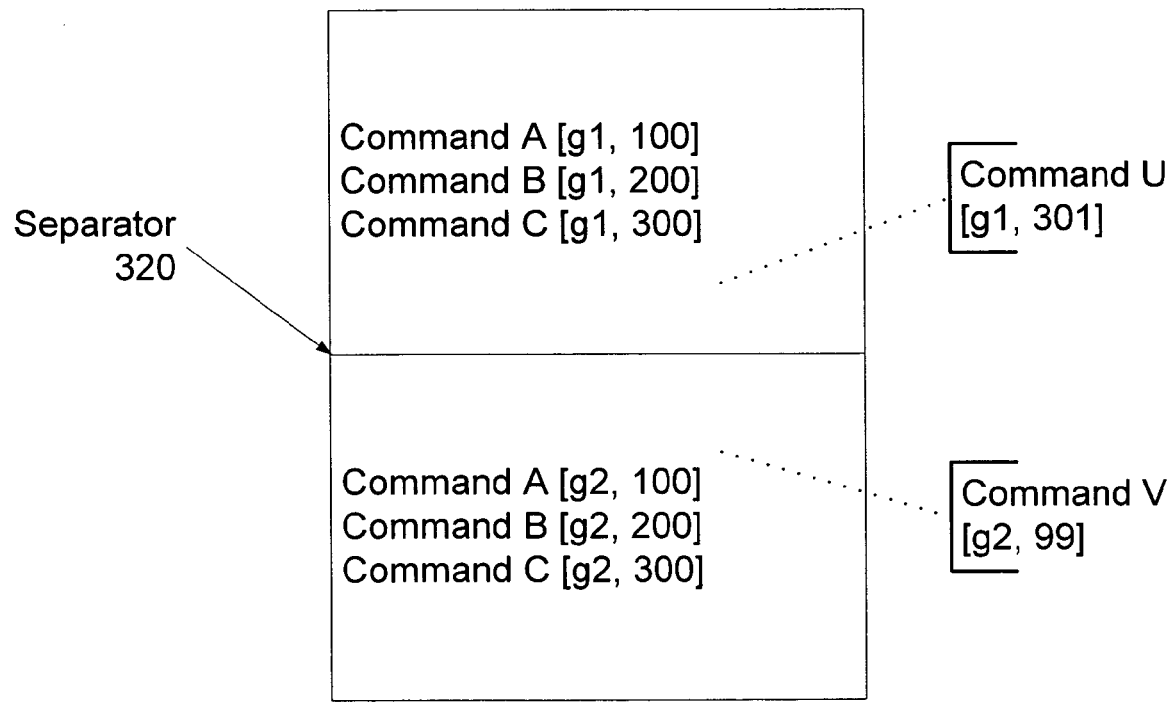
Figure 4C:
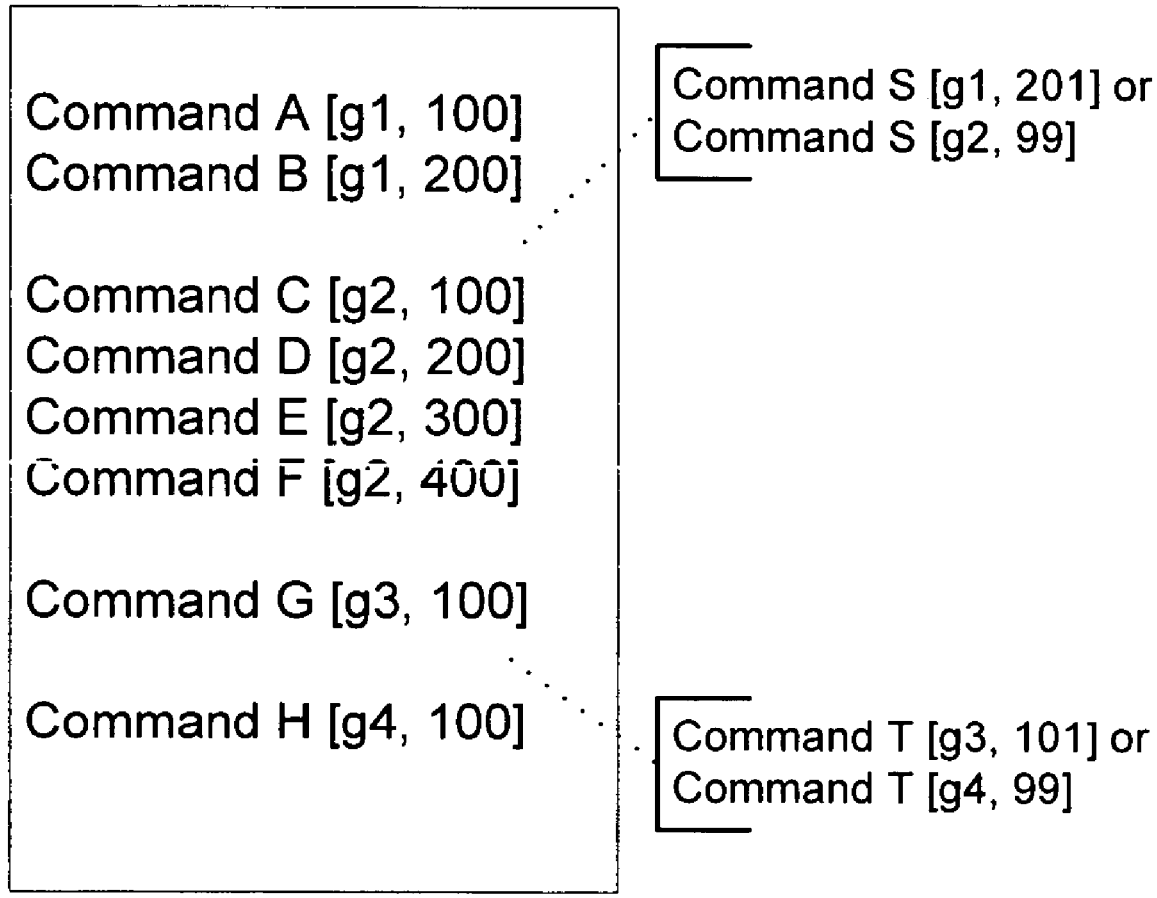

A portion of a menu is illustrated in FIGS. 4a-4c. The menu portion, as shown, may be a section of a pull-down menu of an application UI, where, once selected by a user of the application, the commands are displayed as a vertical listing. This format of the menu as shown in FIGS. 4a-4c is used only as an example and is in no way a limitation to the present invention. For example, the present invention may also be applied to toolbars, other types of menus, icons, or any other medium for displaying the commands of an application to the user through an application UI.

FIGS. 4a-4c illustrate the addition of new commands 330 to existing groups 310 in a menu 300. In FIG. 4a, a group 310 denoted g1 exists in a particular menu 300. Two commands, command X and command Y, are being added to group g1. In order for a command 330 to be placed ahead of command A [g1, 100], which is a command in group 1 with a priority of 100, the command 330 needs to be assigned a priority lower than 100. In the example shown in FIG. 4a, command X belongs to group 1 and has a priority of 99 (command X [g1, 99]), and will therefore be placed ahead of command A. Similarly, to place a command 330 in between 2 existing commands, the priority of the new command 330 is required to be in between the priority of the existing commands 330. FIG. 4a illustrates a command Y [g1, 150] being placed between command A [g1, 100] and command B [g1, 200]. Command Y will accordingly be assigned a priority in between 100 and 200.

FIGS. 4b and 4c show group additions similar to those in FIG. 4a. However, in FIG. 4b, the group, not just the priority, is also of particular importance as the new commands 330 are being placed between existing groups 310. In order to place command U in group 1 but below the last command, command C [g1, 300], command U needs to be assigned to group 1 and be assigned to a priority higher than command C. Accordingly, in the example shown in FIG. 4b, command U is assigned as command U [g1, 301]. Command V is assigned [g2, 99] and will be added to group 2 with a priority of 99, which places command V [g2, 99] above command A [g2, 100] in this portion of the menu 300.

The example menu 300 demonstrated in FIG. 4b incorporates a separator 320. However, in a menu 300, a separator 320 is not required to designate different groups 310. FIG. 4c shows a menu with 4 groups, g1 through g4, without the incorporation of any separators 320. The addition of command S between command B and command C is illustrated. If command S is to be added to g1, then a priority above 300 must be applied, such as command S [g1, 201]. Command S can also be added to g2, as command S [g2, 99]. Similarly, if command T is added to group 3, an identifier such as command T [g3, 101] is necessary; or if T is added to group 4, command T [g4, 99] will suffice. This example, set out in FIG. 4c, exhibits the importance of group and priority identification when separators 320 are not included in a menu 300.

The examples above in FIGS. 4a through 4c do not limit the present invention to menus. A menu 300 is shown only as an example. The present invention may also be applied to toolbars or any other organizational units that can be customized in an application, such as, for example only, toolbars in a spreadsheet processor.

The illustrative examples of FIGS. 4a through 4c are used to demonstrate the manner of tracking the customizations to an application UI 150 by applying tracking information. Importantly, each command is defined by a group and priority placement within the specified group. When a user adds a new command, for example, the system assigns the priority to the command based on the location of the command with the other existing commands.

Figure 5:
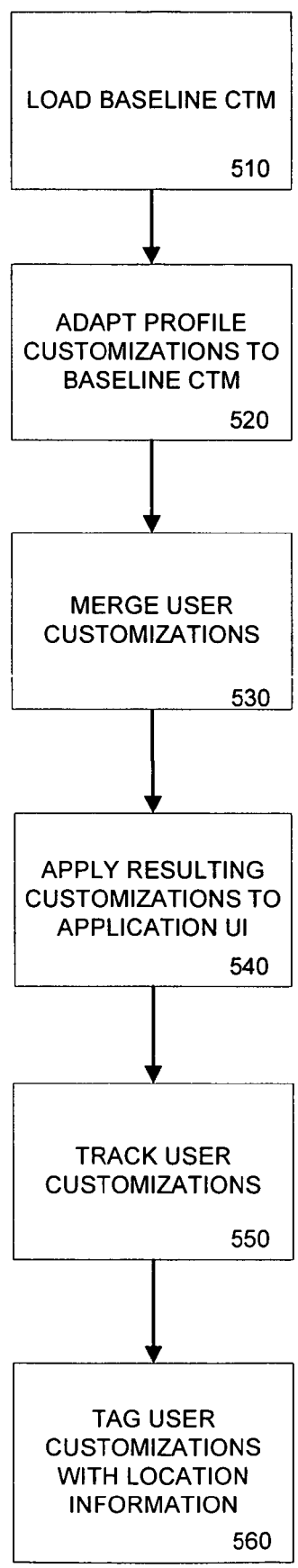
FIG. 5 is a flow diagram representing an exemplary non-limiting sequence of customizing an application in accordance with the invention.

Location information is required for the user customizations 140 in order to track each customized change to the application UI 150. The flowchart of FIG. 5 illustrates a method, according to an embodiment of the present invention, for tracking user customizations 140 and assigning location information to each change. Referring to FIG. 5, at step 510 the baseline CTM 120 is loaded. The baseline CTM 120 is the merger of the add-in modules 110 and includes each contribution from the add-in modules 110. At step 520 the profile customizations 130 are adapted to the baseline CTM 120 to form the application UI 150. At step 530 user customizations 140, if any exist, are merged with the profile customizations 130. Then at step 540 of the method outline in FIG. 5, the resulting customizations are applied to the application UI 150. At step 550, user customizations 140 are tracked, and at step 560, the user customizations 140 are tagged with location information. According to an embodiment of the present invention, the location information is group and priority information. As described in more detail above, the group information may refer to a portion of a drop-down menu containing a plurality of commands. The various groups of a menu are recognized by, for example, an identifying number. Priority information may refer to the positioning of a command within a particular group. The discussion of group and priority information within a menu is made only for example and is not meant to limit the invention to the customization of menus. In fact, the present invention may be applied to toolbars, command bars, or any other medium for displaying the commands of an application to the user through an application UI 150.

Figure 6A:
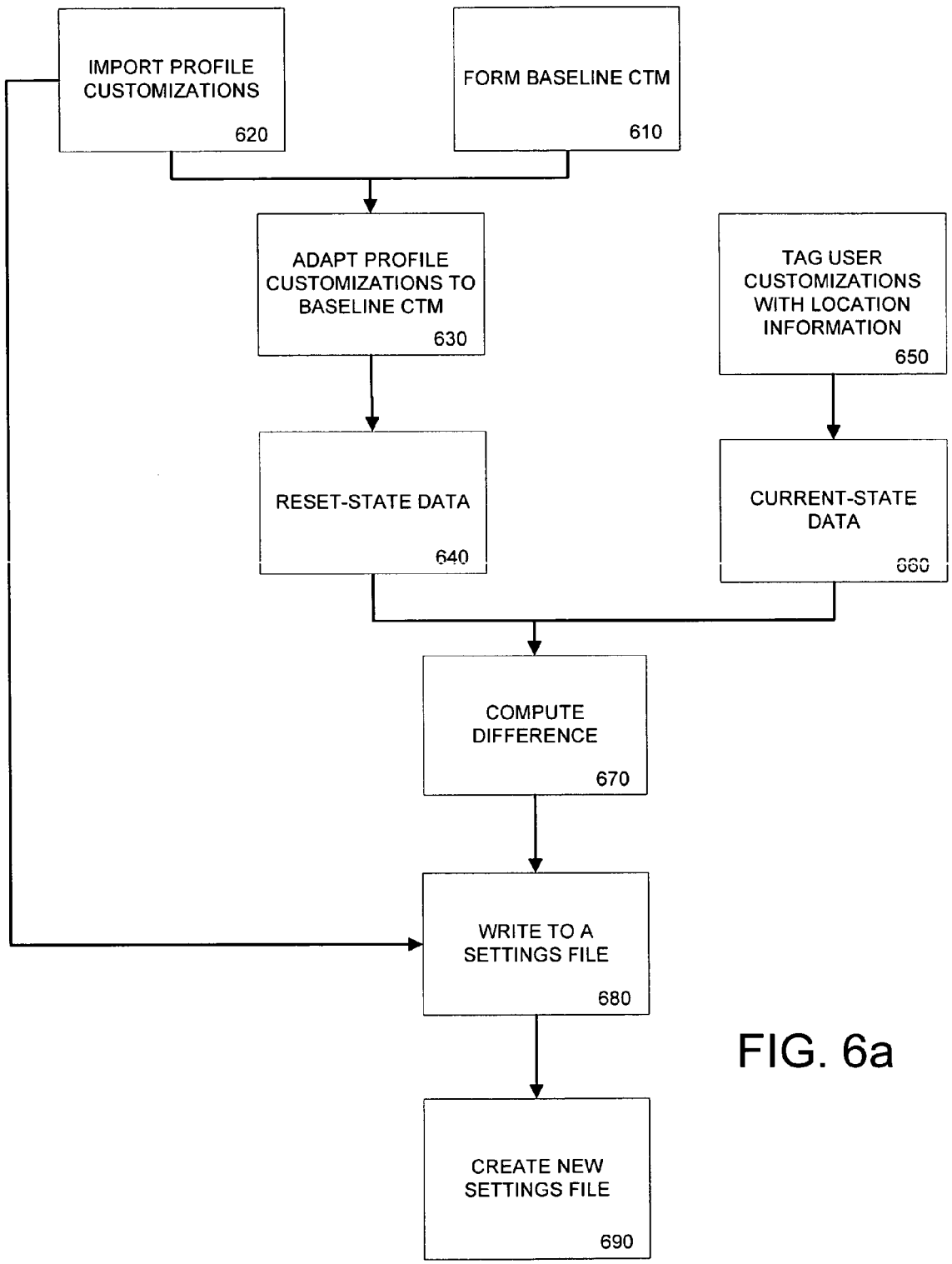
FIGS. 6a-6b are flow charts further illustrating an exemplary non-limiting sequence of customizing an application in accordance with an aspect of the invention.

Referring to FIG. 6a, a method for computing the difference between user customizations 140 and a reset state is shown. According to an embodiment of the present invention, the reset state is defined as the state of the baseline CTM 120 with the profile customizations 130 applied. At step 610 of the method, the baseline CTM 120 is formed as the merger of the CTM contributions of various add-in modules 110. At step 620 profile customizations 130 are imported. At step 630 the profile customizations 130 are adapted to the baseline CTM 120 and are then obtained as reset-state data at step 640. At step 650, the user customizations 140 are tagged with the necessary location information. As described in more detail above, the location information may be group and priority information. The current-state of the application UI 150 is obtained at step 660 of the method of FIG. 6a. The current state is the form of the application UI 150 after user customizations 140 have been made by a user of the system 200. At step 670 the difference between the reset-state and the current-state is computed. The result of this difference, according to an embodiment of the present invention, is known as the user customized deltas. The user customized deltas are written to a settings file, as are the profile customizations 130, at step 680 of the method. A new settings file is then created, at step 690. The new settings file includes both profile and user customizations, the user customizations in the form of the delta, or the difference, between the reset-state and the current state.

The method described above, with reference to FIG. 6a, results in both the profile customizations 130 and the user customizations being saved separately in a settings file. According to another embodiment of the present invention, the profile customizations 130 and the user customized deltas are saved in different files, which allows for user customizations 140 to be applied to another set of profile customizations 130.

Figure 6B:
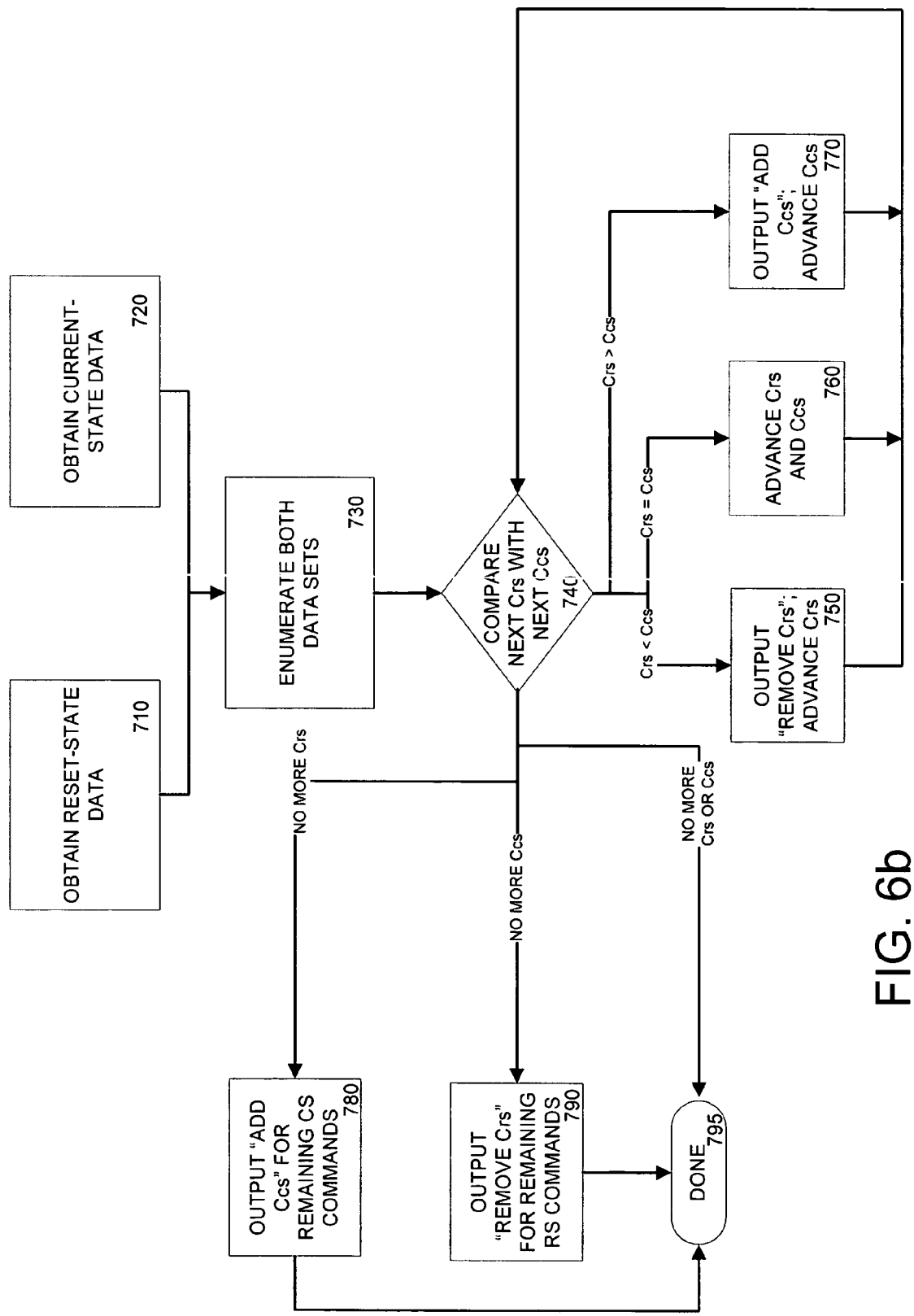

Referring to FIG. 6b, the difference, or delta, computation, shown in FIG. 6a as step 670, is described in further detail. At step 710 and at step 720, the reset-state data and the current-state data are obtained, respectively. The reset data is the state of the baseline CTM 120 with the profile customizations 130 applied, and the current-state data is the form of the application UI 150 after user customizations 140 have been made by a user of the system 200. Each data set, i.e. the reset-state and current-state data, are enumerated at step 730. The enumeration, or ordering, adheres to the following order:

Menu or toolbar identification;
Group priority within the menu or toolbar;
Group identification;
Command priority within the group; and
Command identification.

This enumeration is performed separately for each menu or toolbar of the application UI 150.

At step 740, a comparison is made between a reset-state command and a current-state command. The commands that are compared are those from each state that have not been processed and that are ordered last, according to the above ordering scheme. For ease of discussion, the reset-state command is denoted as Crs, and the current-state command is denoted as Ccs. If the comparison results in Crs being less than that of Ccs, then at step 750 "Remove Crs" is outputted and Crs is advanced. This result shows that, through user customizations, a user has removed this particular command. If Crs is found to equal Ccs, then at step 760, both commands are advanced as there has been no change. If, however, Crs is greater than that of Ccs, then at step 770, the output message "Add Ccs" is provided and the current-state command is advanced. This result shows that, through user customizations, a user has added this particular command. Regardless of the result of the comparison, if a current-state command and a reset-state command have not been evaluated, the comparison of the next commands will continue in the same process described above.

If, however, there are no longer any reset-state commands to be evaluated, all of the remaining current-state commands will be added at step 780. Similarly, if there are no longer any current-state commands to evaluate, all of the remaining reset-state commands will be removed at step 790. After both the reset-state commands and current-state commands have been evaluated and compared, the process ends at step 795.

Figure 7:
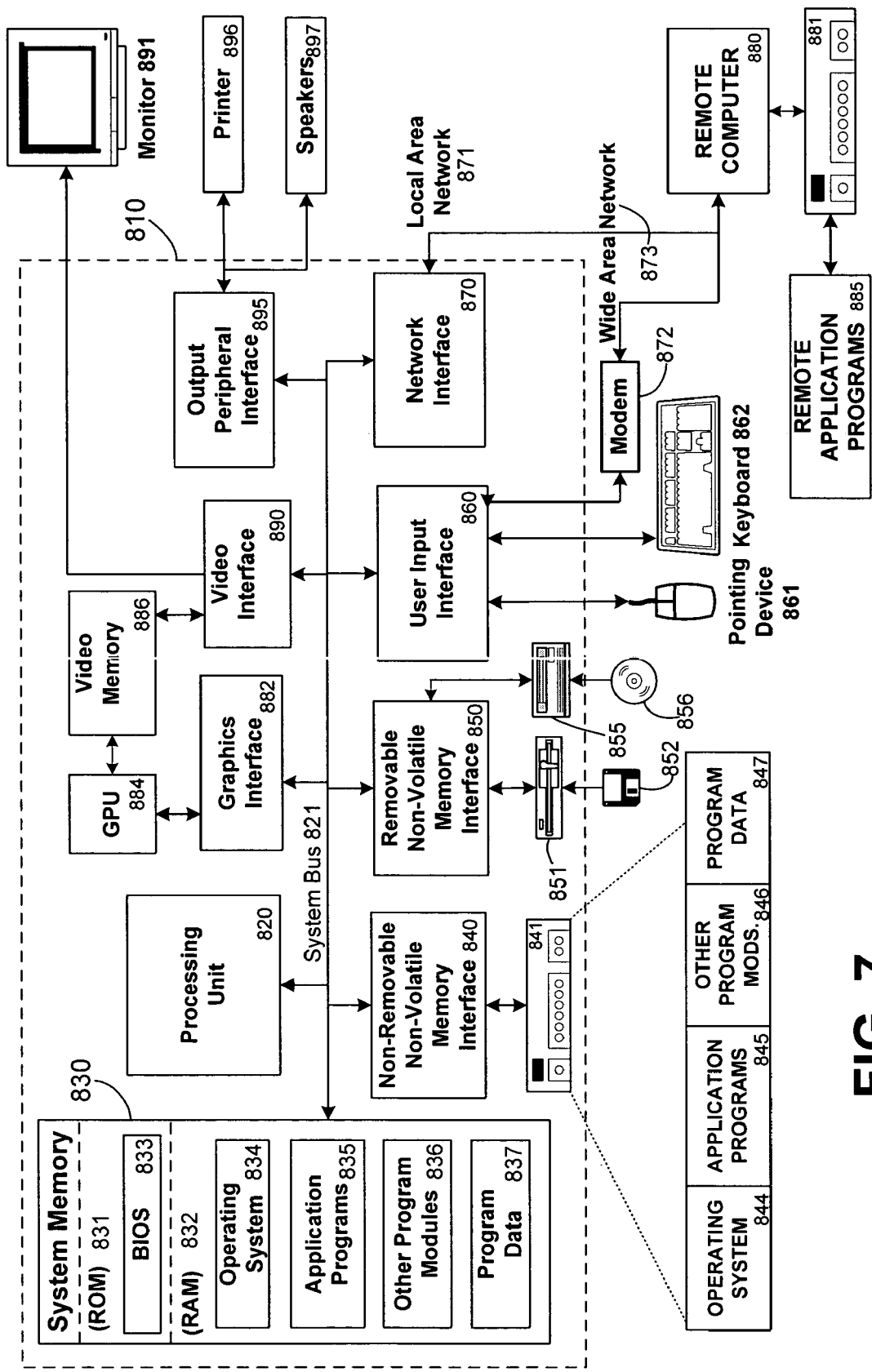
FIG. 7 is a block diagram representing an exemplary non-limiting computing device in which the present invention may be implemented.

FIG. 7 and the following discussion provide a brief, general description of a suitable computing environment in connection with which the present invention may be implemented. The invention is operational with numerous other general-purpose or special-purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 7, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI Express (PCIe).

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable, volatile/nonvolatile computer storage media. By way of example only, FIG. 7 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 7 provide storage of computer readable instructions, data structures, program modules and other data for the computer 810. In FIG. 7, for example, hard disk drive 841 is illustrated as storing operating system 844, application programs 845, other program modules 846, and program 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus 821, but may be connected by other interface and bus structures, such as a parallel port, game port or a universal serial bus (USB). These are the kinds of structures that are virtualized by the architectures of the invention. A graphics interface 882, such as one of the interfaces implemented by the Northbridge, may also be connected to the system bus 821. Northbridge is a chipset that communicates with the CPU, or host processing unit 820, and assumes responsibility for communications such as PCI, PCIe and accelerated graphics port (AGP) communications. The invention contemplates both Integrated (inside the Northbridge) and discrete (outside the Northbridge) graphics implementations. One or more graphics processing units (GPUs) 884 may communicate with graphics interface 882. In this regard, GPUs 884 generally include on-chip memory storage, such as register storage and GPUs 884 communicate with a video memory 886. GPUs 884, however, are but one example of a coprocessor and thus a variety of co-processing devices may be included in computer 810, and may include a variety of procedural shaders, such as pixel and vertex shaders. A monitor 891 or other type of display device is also connected to the system bus 826 via an interface, such as a video interface 890, which may in turn communicate with video memory 886. In addition to monitor 891, computers may also include other peripheral output devices such as speakers 897 and printer 896, which may be connected through an output peripheral interface 895.

The computer 810 may operate in a networked or distributed environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 7. The logical connections depicted in FIG. 7 include a local area network (LAN) 871 and a wide area network (WAN) 873, but may also include other networks/buses. Such networking environments are commonplace in homes, offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on memory device 881. It will be appreciated that the network connections shown are exemplary and other means of establishing a communications link between the computers may be used.

There are multiple ways of implementing the present invention, e.g., an appropriate API, tool kit, driver code, operating system, control, standalone or downloadable software object, etc. which enables applications and services to use the virtualized architecture(s), systems and methods of the invention. The invention contemplates the use of the invention from the standpoint of an API (or other software object), as well as from a software or hardware object that receives any of the aforementioned techniques in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to a variety of computing devices or systems. For instance, the various algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed is:

1. A computer-implemented method of customizing an application, the method comprising:
    adapting a profile customization to the application to customize commands of a UI (user interface) of the application, and providing location information for the profile customization which describes a location of the profile customization of commands in the application UI;
    tracking a user customization to commands of the application UI, and providing location information for the user customization which describes a location of the user customization of commands in the application UI;
    using the location information of the profile and user customizations to compute a difference between the user-customized application and the profile-customized application, wherein a result of the difference computation forms a data set of user customized deltas that represent user customization settings; and
    storing a set of customizations including the profile customization and the data set of user customized deltas as the user customization, wherein the user customization is stored separate from the profile customization.

2. The method of claim 1, wherein the application comprises a contribution from at least one add-in module, wherein the contribution is applied to at least one of a command, a menu, or a toolbar of the application.

3. The method of claim 1, further comprising:
    adding a contribution to the application from an add-in module; and
    applying the stored profile customization and the data set of user customized deltas to the resulting application.

4. The method of claim 1, further comprising:
    removing a contribution to the application from an add-in module; and
    applying the stored profile customization and the data set of user customized deltas to the resulting application.

5. The method of claim 1, wherein the profile customization and the user customization are applied to one of (i) a menu and (ii) a toolbar.

6. The method of claim 1, wherein the location information comprises at least one of (i) a group information and (ii) a priority information.

7. The method of claim 1, further comprising:
    resetting the application to the profile customization by removing the user customization from the stored set of customizations.

8. A computer readable storage medium having program code stored therein for use in a system comprising a processor and a memory, the program code causing the processor to perform the following steps:
    adapting a profile customization to an application to customize commands of a UI (user interface of the application, and providing location information for the profile customization which describes a location of the profile customization of commands in the application UI;
    tracking a user customization to commands of the application UI, and providing location information for the user customization which describes a location of the user customization of commands in the application UI;
    using the location information of the profile and user customizations to compute a difference between the user-customized application and the profile-customized application, wherein a result of the difference computation forms a data set of user customized deltas that represent user customization settings; and
    storing a set of customizations including the profile customization and the data set of users customized deltas as the user customization, wherein the user customization is stored separate front the profile customization.

9. The computer readable storage medium of claim 8, wherein the application comprises a contribution from at least one add-in module, wherein the contribution is applied to at least one of a command, a menu, or a toolbar of the application.

10. The computer readable storage medium of claim 8, wherein the program code causes the processor to further perform the following steps:
    adding a contribution to the application from an add-in module; and
    applying the storage profile customization and the data set of user customized deltas to the resulting application.

11. The computer readable storage medium of claim 8, wherein the program code causes the processor to further perform the following steps:
    removing a contribution to the application from an add-in module; and
    applying the storage profile customization and the data set of user customized deltas to the resulting application.

12. The computer readable storage medium of claim 8, wherein the profile customization and the user customization are applied to one of (i) a menu and (ii) a toolbar.

13. The computer readable storage medium of claim 8, wherein the location information comprises at least one of (i) a group information and (ii) a priority information.

14. A computer system comprising:
    a memory;

a processor;

control code stored in a first portion of said memory comprising computer readable instructions capable of performing the following steps:

adapting a profile customization to an application to customized commands of a UI (user interface) of the application, and providing location information for the profile customization which describes a location of the profile customization of commands in the application UI;

tracking a user customization to commands of the application UI, and providing location information for the user customization which describes a location of the user customization of commands in the application UI;

using the location information of the profile and user customizations to compute a difference between the user-customized application and the profile-customized application, wherein a result of the difference computation forms a data set of user customized deltas that represent user customization settings; and storing a set of customizations including the profile customization and the data set of user customized deltas as the user customization, wherein the user customization is stored separate from the profile customization.

15. The computer system of claim 14, wherein the application comprises a contribution from at least one add-in module, wherein the contribution is applied to at least one of a command, a menu, or a toolbar of the application.

16. The computer system of claim 14, wherein the computer readable instructions are further capable of performing the following steps:

adding a contribution to the application from an add-in module; and applying the stored profile customization and the data set of user customized deltas to the resulting application.

17. The computer system of clam 14, wherein she computer readable instructions are further capable of performing the following steps:

removing a contribution to the application from an add-in module; and applying the stored profile a customization and the data set of user customized deltas to the resulting application.

18. The computer system of claim 14, wherein the profile customization and the user customization are applied to one of (i) a menu and (ii) a toolbar.

19. The computer system of claim 14, where in the location information comprises at least one of (i) a group information and (ii) a priority information.

20. The method of claim 6, wherein the group information comprises a group identifier for a group of commands, and wherein the priority information for a group of commands indicates a position placement of each command within the group of commands.

* * * * *

UNITED STATES PATENT AND TRADEMARK OFFICE
CERTIFICATE OF CORRECTION

| | | |
|---|---|---|
| PATENT NO. | : 7,472,376 B2 | Page 1 of 1 |
| APPLICATION NO. | : 11/139816 | |
| DATED | : December 30, 2008 | |
| INVENTOR(S) | : Aaron T. Burcham et al. | |

It is certified that error appears in the above-identified patent and that said Letters Patent is hereby corrected as shown below:

On the Title page, in Item (75), Inventors, in column 1, line 5, delete "James Kal Yu Lau" and insert -- James Kai Yu Lau --, therefor.

In column 12, line 23, in Claim 8, delete "interface" and insert -- interface) --, therefor.

In column 12, line 38, in Claim 8, delete "users" and insert -- user --, therefor.

In column 12, line 40, in Claim 8, delete "front" and insert -- from --, therefor.

In column 12, line 51, in Claim 10, delete "storage" and insert -- stored --, therefor.

In column 12, line 58, in Claim 11, delete "storage" and insert -- stored --, therefor.

In column 13, line 5-6, in Claim 14, delete "customized" and insert -- customize --, therefor.

In column 14, line 8, in Claim 17, delete "clam" and insert -- claim --, therefor.

In column 14, line 8, in Claim 17, delete "she" and insert -- the --, therefor.

In column 14, line 13, in Claim 17, after "profile" delete "a".

In column 14, line 18, in Claim 19, delete "where in" and insert -- wherein --, therefor.

Signed and Sealed this

Twenty-fourth Day of August, 2010

David J. Kappos
*Director of the United States Patent and Trademark Office*